P. BRADFORD.
Sausage Filler.
No. 55,760.
Patented June 19, 1866.
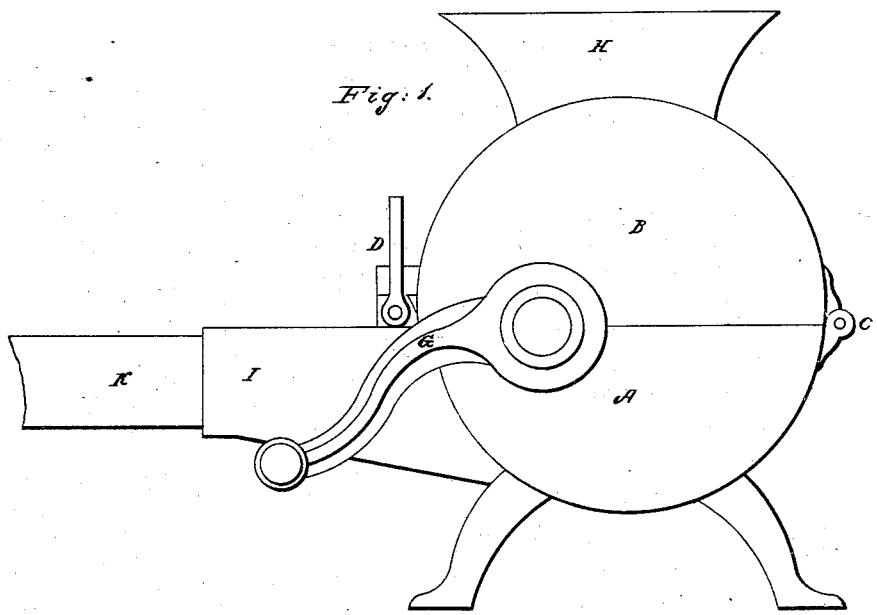
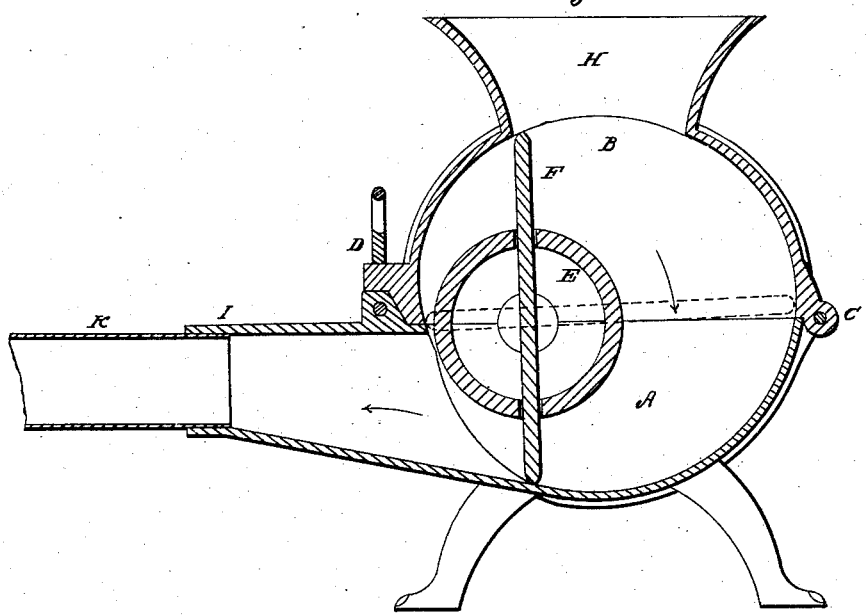

UNITED STATES PATENT OFFICE.

PURMORT BRADFORD, OF NEW HAVEN, CONNECTICUT, ASSIGNOR TO SARGENT & CO., OF SAME PLACE.

IMPROVED SAUSAGE-STUFFER.

Specification forming part of Letters Patent No. 55,760, dated June 19, 1866.

*To all whom it may concern:*

Be it known that I, PURMORT BRADFORD, of New Haven, in the county of New Haven and State of Connecticut, have invented a new Improvement in Sausage-Stuffers; and I do hereby declare the following, when taken in connection with the accompanying drawings and the letters of reference marked thereon, to be a full, clear, and exact description of the same, and which said drawings constitute part of this specification, and represent, in—

Figure 1, a side view, and in Fig. 2 a vertical central section of the same.

This invention relates to an improvement in machines for stuffing sausages, its object being to construct a stuffer the operation of which shall be continuous, thereby saving a large proportion of the time required for the use of the common piston-stuffer; and my invention consists in the arrangement of a sliding piston within a case, the axis of motion of which is eccentric to the case, and combining therewith a hopper for supplying the meat and an outlet through which the meat is discharged into the skins; and in order that others may be enabled to construct and use my improvement, I will proceed to describe the same as illustrated in the accompanying drawings.

A is the lower part of the case, and B the upper, the two parts together forming what is termed the "heart form." The two parts are hinged together at C, and locked by any convenient device, D, the lower part supported upon legs or otherwise.

Eccentric to the case, or at what may be termed the "axis" of the heart, I arrange in proper bearings a cylinder, E, passing through the center of which I fix a sliding piston, F, so that as the cylinder E is revolved by means of the crank G the piston will slide in the said cylinder and be revolved, its two edges traversing the inner surface of the case.

H is a hopper through which meat properly prepared is supplied to the machine. I is the outlet arranged with a tube, K, upon which the skins are placed. The skins are placed upon the tube K in the usual manner, and through the hopper H meat is supplied to the machine. Then revolving the piston, as before described, that which is the upper edge in Fig. 2 will force the meat around in the direction denoted by the arrow, the form of the case forcing the piston forward, so that at all parts it fills the space between the case and the cylinder E, as denoted in red, Fig. 2. Thus revolving, the meat is carried around until it comes to the outlet, whence it is forced into the sausage-skins.

The cylinder E, I have represented as hollow, which is made so only to lessen the weight and cost of construction. The outer cylinder or case is opened, and the several parts removed for cleaning in like manner as the many rotary meat-cutters with which all for whose benefit this description is made are presumed to be familiar.

I am aware of the sausage-stuffer by J. J. Weeks, patented September 19, 1854, but the form of the cylinder in his machine differs materially from my own, his being a cylinder equal in diameter at all points, by which construction it is impossible that the piston should fill the cylinder to force all the meat before it; and, further, it will be observed that the cylinder in his machine is made in two parts transversely, and not constructed so as to be opened for the purpose of cleaning, &c., whereas my case is of the heart form described, whereby the piston fills the cylinder at all points, and is constructed in two parts hinged together, so as to be opened longitudinally.

I do not therefore broadly claim a sausage-stuffer constructed to operate by the movement of a piston sliding in a revolving cylinder within and eccentric to an outer cylinder or case.

Having therefore thus fully described my invention, what I claim as new and useful, and desire to secure by Letters Patent, is—

The combination and arrangement of the outer case of the form described, constructed in two parts, A and B, hinged together, as specified, having a hopper, H, on the one part and an outlet, I, on the other part, with the cylinder E and piston F, constructed and arranged to operate substantially in the manner and for the purpose herein set forth.

PURMORT BRADFORD.

Witnesses:
 JOHN E. EARLE,
 ALTSIE J. TIBBITS.